United States Patent
Ramezani et al.

(10) Patent No.: US 10,669,099 B2
(45) Date of Patent: Jun. 2, 2020

(54) ROLLER SYSTEM HAVING SPACED APART EXTERNAL ROTOR MOTOR

(71) Applicant: Volta 24 LLC, Milwaukee, WI (US)

(72) Inventors: Kamran Ramezani, La Jolla, CA (US); Jason Ocain, Saint Francis, WI (US); Tony Hill, Wauwatosa, WI (US); Dean Panas, New Berlin, WI (US)

( * ) Notice: Subject to any disclaimer, the term of this patent is extended or adjusted under 35 U.S.C. 154(b) by 0 days.

(21) Appl. No.: 16/671,116

(22) Filed: Oct. 31, 2019

(65) Prior Publication Data

US 2020/0062507 A1 Feb. 27, 2020

Related U.S. Application Data

(63) Continuation of application No. 16/128,221, filed on Sep. 11, 2018, which is a continuation of application No. 15/601,630, filed on May 22, 2017, now Pat. No. 10,093,483.

(60) Provisional application No. 62/340,482, filed on May 23, 2016.

(51) Int. Cl.
*B65G 13/07* (2006.01)
*B65G 13/04* (2006.01)
*H02K 7/10* (2006.01)
*H02K 7/08* (2006.01)
*B65G 39/12* (2006.01)
*B65G 13/06* (2006.01)

(52) U.S. Cl.
CPC ............ *B65G 13/07* (2013.01); *B65G 13/04* (2013.01); *B65G 13/06* (2013.01); *B65G 39/12* (2013.01); *H02K 7/086* (2013.01); *H02K 7/1016* (2013.01)

(58) Field of Classification Search
CPC ....................................................... B65G 23/14
USPC ............................... 198/370.01, 781.01, 833
See application file for complete search history.

(56) References Cited

U.S. PATENT DOCUMENTS

| 8,561,790 B2* | 10/2013 | Brayman | B65G 13/071 198/370.01 |
| 2010/0059314 A1* | 3/2010 | Haines | E04F 11/025 182/116 |
| 2013/0134017 A1* | 5/2013 | Hall | B65G 43/00 198/794 |
| 2016/0280465 A1* | 9/2016 | Backhaus | B65G 15/50 |

* cited by examiner

*Primary Examiner* — Gene O Crawford
*Assistant Examiner* — Lester III Rushin
(74) *Attorney, Agent, or Firm* — Nutter McClennen & Fish LLP

(57) ABSTRACT

A roller system has a frame, a plurality of rollers (supported by the frame) forming a roller plane, and an external rotor motor ("motor") spaced from the roller plane. As an external rotor motor, the motor has a stator and an external rotor radially outward of the stator to substantially circumscribe the stator. To kinetically couple the motor with the rollers, the system also has a transmission coupling coupled with the external rotor and at least one of the rollers. The transmission coupling and external rotor are configured so that rotation of the external rotor causes the at least one roller to rotate in response to a torque received through the transmission coupling.

20 Claims, 14 Drawing Sheets

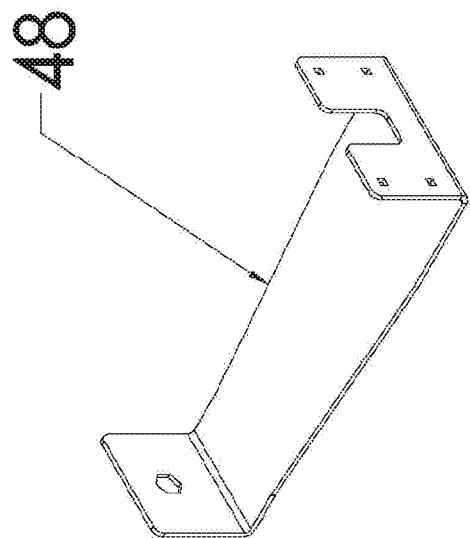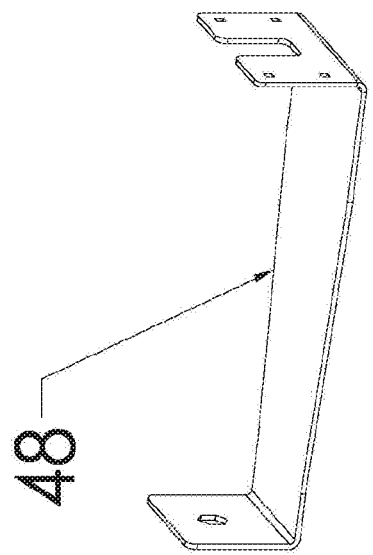
FIG 8B ns, and claims priority from provisional U.S. patent

ROLLER SYSTEM HAVING SPACED APART EXTERNAL ROTOR MOTOR

PRIORITY

This patent application is a continuation of U.S. patent application Ser. No. 16/128,221, filed Sep. 11, 2018 and entitled "ROLLER SYSTEM HAVING SPACED APART EXTERNAL ROTOR MOTOR," naming Kamran Ramezani, Jason Ocain, Tony Hill, and Dean Panas as inventors, which is a continuation of U.S. patent application Ser. No. 15/601,630, filed May 22, 2017, now U.S. Pat. No. 10,093,483, and entitled "ROLLER SYSTEM HAVING SPACED APART EXTERNAL ROTOR MOTOR," naming Kamran Ramezani, Jason Ocain, Tony Hill, and Dean Panas as inventors, and claims priority from provisional U.S. patent application No. 62/340,482, filed May 23, 2016, entitled, "GEARLESS MOTORIZED ROLLER UNDER THE ROLLER CONVEYER SYSTEM AS THE DRIVING FORCE," and naming Kamran Ramezani as the sole inventor. The disclosures of all the above noted patents and patent applications are incorporated herein, in their entireties, by reference.

FIELD OF THE INVENTION

Various embodiments of the invention generally relate to roller systems and, more particularly, various embodiments of the invention relate to efficient and effective roller systems.

BACKGROUND OF THE INVENTION

Ever more items are purchased on the Internet using online merchants, such as Amazon and eBay. These merchants often store their items in a warehouse until they are retrieved for delivery. After retrieval, the items often are moved from one region of the warehouse to another warehouse region using a roller system (also known as a "conveyer system" or "roller conveyer"). Ultimately, the items typically are loaded from the roller system onto trucks for delivery. As the world economy increasingly uses this business model, roller system efficiency, robustness, and cost become even more important.

Online merchants certainly are not the only companies that use roller systems. For example, factories, wholesalers, and others have used roller systems for years. Accordingly, their benefit and efficient use impacts an even wider swath of the economy.

SUMMARY OF VARIOUS EMBODIMENTS

In accordance with one embodiment of the invention, a roller system (also known in the art as a "conveyer system") has a frame, a plurality of rollers (supported by the frame) that each have a roller shaft, and an external rotor motor ("motor") having a motor shaft. The plurality of roller shafts forms a roller shaft plane, and the motor shaft is spaced from the roller shaft plane. As an external rotor motor, the motor has a stator and an external rotor radially outward of the stator to substantially circumscribe the stator. To kinetically couple the motor with the rollers, the system also has a transmission coupling coupled with the external rotor and at least one of the rollers. The transmission coupling and external rotor are configured so that rotation of the external rotor causes the at least one roller to rotate in response to a torque received through the transmission coupling.

The frame preferably has a first frame portion spaced from a second frame portion and is configured so that a plurality of the rollers and the motor are positioned between the first and second frame portions. The motor may have a first end coupled with the first frame portion, and a second end coupled with the second frame portion. Alternatively, the system may have a support member supporting the motor. In that case, the motor may have a first end coupled with the frame, and a second end coupled with the support member. The second end preferably is spaced from the frame. Thus, the support member may support at least one of the first and second ends of the motor even though the second end is spaced from the frame. A removable coupling may be configured to removably secure the motor to the frame.

The motor may include a gearless motor. For example, the motor may be a brushless DC motor with a sintered ring magnet. Moreover, the transmission coupling may include a transmission belt circumscribing at least a portion of the external rotor and at least a portion of the at least one roller. Among other things, transmission coupling may include one of a band, a flex coupling, a chain, and a timing belt.

Motion of the roller coupled with the motor may be transferred to other rollers. For example, the plurality of rollers may include an additional roller coupled with the at least one roller by a secondary transmission coupling. The secondary transmission coupling and the at least one roller are configured so that rotation of the at least one roller causes the additional roller to rotate in response to an additional torque received through the secondary transmission coupling.

To mitigate the stresses of a cantilevered motor coupling, illustrative embodiments avoid a cantilevered coupling. To that end, an external rotor includes a first end and a second end, and the rotor is positioned relative to the stator via a first bearing and a second bearing. The first bearing is closer to the first end than to the second end, and the second bearing is closer to the second end than to the first end. The transmission coupling is coupled with the external rotor between the first and second bearings. Moreover, to provide a relatively high torque, the rotor outer dimension may be greater than the roller outer dimension.

In accordance with another embodiment, a roller system has a frame with a first frame portion spaced from a second frame portion, a plurality of rollers rotatably coupled between the first frame portion and the second frame portion and forming a roller plane, and a gearless DC motor ("motor") spaced from the roller plane and positioned between the first frame portion and the second frame portion. The motor has a stator and an external rotor. Accordingly, the external rotor is radially outward of the stator. The system also has a transmission coupling coupled with the external rotor and at least one of the plurality of rollers. Rotation of the external rotor causes rotation of at least one other roller (e.g., the roller to which it is coupled via the transmission coupling).

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 8B schematically shows a perspective view of a motor support bracket used configured in accordance with illustrative embodiments of the invention.

DESCRIPTION OF ILLUSTRATIVE EMBODIMENTS

In illustrative embodiments, a roller system has a reliable, robust and well-positioned motor that is relatively easy to service and replace, provides a high torque, and/or can be scaled to fit a plurality of different sizes and types of roller systems. To that end, the motor is spaced from a plane formed by a plurality of rollers coupled with a system frame, and has an external rotor used in a manner that avoids cantilevering. Specifically, using a transmission coupling controlled by the external rotor, the motor transmits its torque to one or more of the rollers to rotate the rollers, enabling the roller system to transport objects along its length. Details of illustrative embodiments are discussed below.

Figure 1:
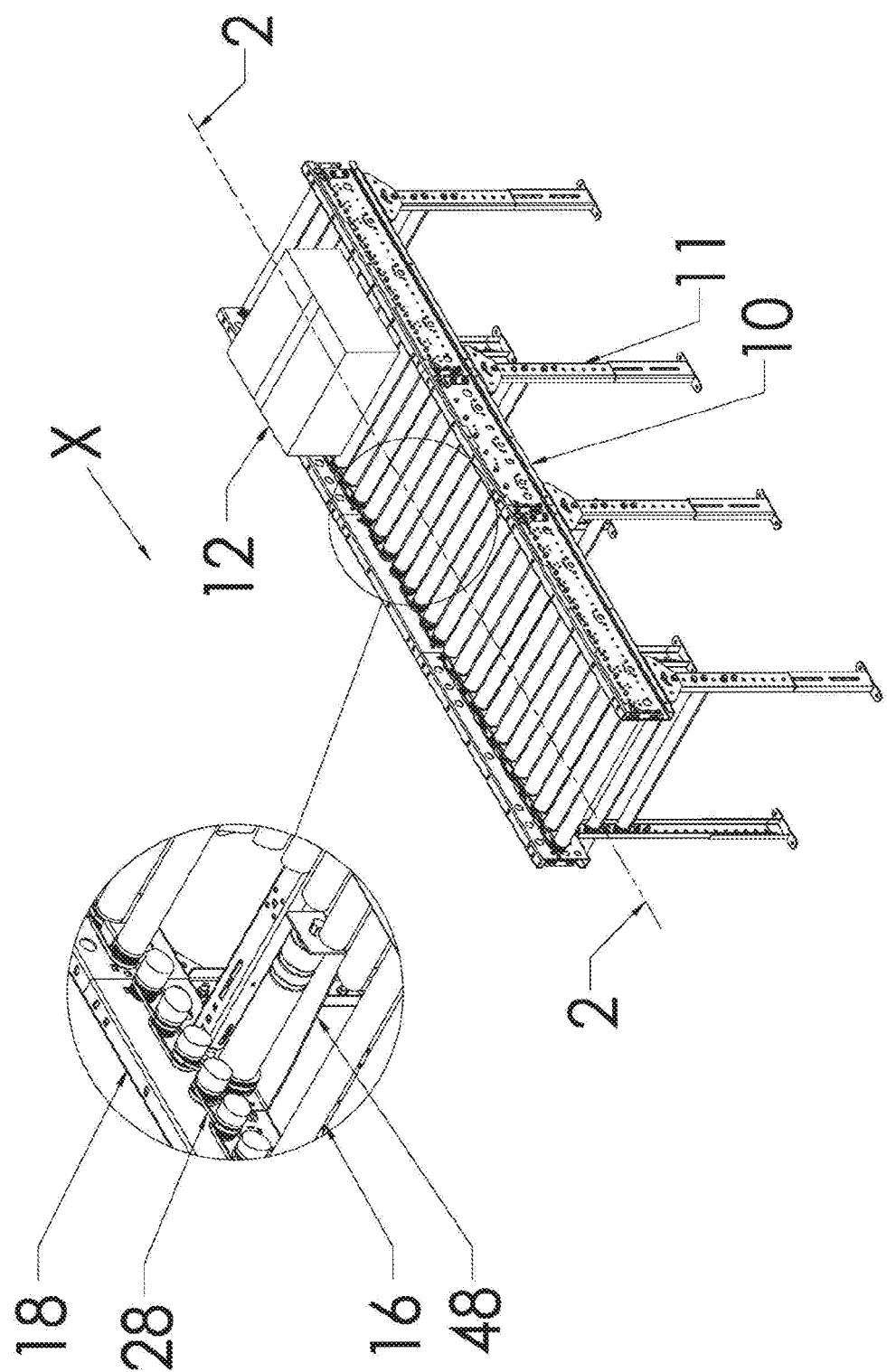
FIG. 1 schematically shows a roller system during use that may be configured in accordance with illustrative embodiments of the invention.

FIG. 1 schematically shows a roller system 10 that may be configured in accordance with illustrative embodiments of the invention. In this example, the roller system 10 moves objects 12 along its length. For example, the objects 12 can be parcels or boxes to be shipped to an ultimate destination, such as a warehouse, store, or consumer. The roller system 10 therefore provides an automated and efficient mechanism for moving objects 12 from one area to another area. In fact, as people increasingly make online purchases, some would say that they have become indispensable in the Internet economy.

To those ends, the roller system 10 has a frame 14 supporting a plurality of individual rollers 16. Specifically, the frame 14 may be considered to have first and second frame members 18 secured together by one or more cross-members (not shown) bolted or otherwise secured with both of the members 18. Among other materials, the frame members 18 may be formed from steel or other material that one skilled in the art may select to provide the necessary structural support.

The frame members 18 in FIG. 1 are shown as rigid members. Alternative embodiments, however, may form the frame members 18 from movable, expandable, and/or flexible materials. Such embodiments thus are flexible so that the roller system 10 can be moved or rotated in different ways to fit into a variety of non-straight configurations. For example, the frame members 18 may be formed from a lattice with a hinge at each intersection point of the lattice members. The frame members 18 may be movable and expandable.

FIG. 1 schematically shows optional elevation members 11 that elevate the frame above the floor. These elevation members 11 may be adjustable or to fixed/not adjustable in height. Some embodiments eliminate the elevation members 11 entirely so that the frame can rest directly on the floor (e.g., to move pallets).

The rollers 16 extend between the two frame members 18 and effectively form a roller plane (shown in the below discussed FIG. 2 as reference number "22") along which the objects 12 move. This roller plane 22 may be considered to have a thickness that is approximately equal to the thickness of the rollers 16. Such a thick plane therefore may have a top planar portion and a bottom planar portion. During use, objects 12, such as that shown in FIG. 1, traverse along the top planar portion of the roller plane 22. In illustrative embodiments, the motor 30 is not within the volume of the roller plane 22. In alternative embodiments, the motor 30 is partially within the volume of the roller plane 22 and thus, still spaced relative to it—i.e., spaced from a portion of it.

As discussed in greater detail below, the rollers 16 preferably are not energized (i.e., they are non-motorized). Specifically, the rollers 16 may be formed from a stainless steel tubular body 24 with a belt region 26 to receive a torquing force via a transmission coupling 28. A contiguous or non-contiguous portion of the outer surface of each roller 16 preferably is generally smooth to convey objects 12 along its length, while the rest of the outer surface, which can be contiguous or non-contiguous, may include the belt region 26. Alternatively, the outer surface portion for conveying objects 12 may have some frictional surface, such as rubber pads and/or rubberized surfaces, to aid in transmitting the objects 12. Each of the rollers 16 also may have basic internal components common in conventional rollers, such as stationary shaft 36 (see the below discussed FIG. 3, which shows the end of the shaft 36) coupled with the tubular roller body 24 by means of a pair of conventional bearings (not shown). Alternative embodiments also may intersperse one or more motorized rollers 16 in the plane of rollers 16. Illustrative embodiments, however, do not require such motorized rollers 16.

Those skilled in the art may couple the rollers 16 to each frame member 18 by any of a variety of conventional means. For example, the portions of the shaft 36 at each end of the roller 16 may be threaded and thus secured to its respective frame member 18 using a bolt (not shown). This connection enables easy replacement of malfunctioning rollers 16. Those portions of the shaft 36 preferably also have structure for preventing shaft rotation. Among other ways, the portions of the shaft 36 at each end of the roller 16 may have a special cross-sectional shape, such as a hexagonal or rectangular shape, that extends through a corresponding female shape in the respective frame member 18. For example, a portion of the shaft 36 having a hexagonal cross-sectional shape may extend through a hexagonal opening through the frame member 18. The inner dimension of the hexagonal opening should be slightly larger than the outer dimension of the shaft 36 and yet, provide a reasonably tight fit. Alternative embodiments omit the fastening device, such as the noted nut. In that case, the rollers 16 are simply secured by their coupling with corresponding openings in the frame members 18.

The roller system 10 may be configured to move objects 12 in one direction, or in two directions. For example, one set of rollers 16 may be configured to move objects 12 to the right from the perspective of the drawing, while another set of rollers 16 may be configured to move objects 12 to the left from the perspective of the drawing. These rollers 16 may be configured to move objects 12 in the respective directions at different times, or at the same time. Accordingly, such a roller system 10 has an energizing mechanism configured to move in the desired manners. As another example, the roller system 10 may be configured to move objects 12 to the left, to the right, and/or to both the left and the right. To these ends, a switch or other control mechanism (not shown) may enable the user to select one of those three modes of operation.

It should be noted that FIG. 1 shows the roller system 10 as being linear and planar. Alternative embodiments, however, may apply to roller systems 10 that are nonlinear and where three or more rollers 16 to not necessarily form a plane. Among other things, rather than having a linear overall shape (in plan view), the roller system 10 may have an angled shape, a circular shape, an elliptical shape, a sinusoidal shape, or a random shape. Moreover, from a side view, the roller system 10 may take on nonplanar shapes and thus, may form a sinusoidal or other nonlinear shape. In either case, two of the rollers 16 still may be considered to form the noted plane.

Figure 2:
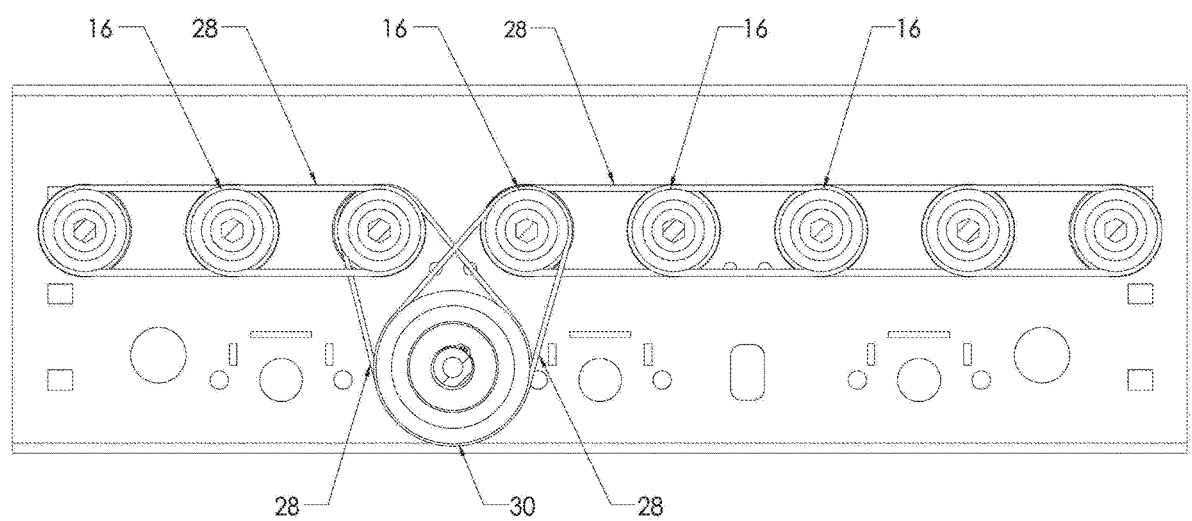
FIG. 2 schematically shows a cross-sectional view of the roller system of FIG. 1 across line 2-2.

Indeed, the non-motorized rollers 16 do not have the inherent torque to move objects 12 on its surface. To provide that torque, illustrative embodiments have a motor 30, spaced away from the rollers 16, that couples with one or more rollers 16 to provide the noted torque. To better detail the motor 30 and its relation with the rollers 16, FIG. 2 schematically shows a cross-sectional view of the roller system 10 of FIG. 1 across line 2-2. As shown, the motor 30 is spaced from the rollers 16 but within the region encompassed by the frame 14 (the "frame region 20"). In this case, the motor 30 is spaced away from the roller plane 22 formed by two rollers 16 immediately above it from the perspective of FIG. 2. In illustrative embodiments, as shown in FIG. 2, the motor 30 is spaced away from at least the roller 16 to which it is directly coupled. In addition, the motor 30 is between the two frame members 18 that together form the frame 14.

The motor 30 in this example delivers its torque to two different rollers 16 via two separate transmission couplings 28. In other words, rotation of its external rotor 32 (discussed below) causes the two rollers 16 to rotate in response to a corresponding torque received through their transmission couplings 28. Of course, those transmission couplings 28 do not contact the same portion of the belt region 26 of the motor 30. Those skilled in the art may select any of a wide variety of different types of transmission couplings 28. That selection may depend on a wide variety of factors, such as cost, effectiveness, intended use and specifications of the roller system 10. For example, for a better grip, the transmission couplings 28 may be the so-called "Poly-V" type, which forms a series of V-shaped ridges that mate with corresponding V-shaped grooves in the belt region 26 of the roller 16. Other embodiments may use so-called "O-ring" transmission couplings 28, which have generally smooth outer surfaces.

Accordingly, the transmission couplings 28 may include a band, a flex coupling, a chain, and a timing belt, and these couplings may be made from any of a variety of single or composite materials, such vinyl, rubber, and/or metal. In fact, while preferred embodiments use the same type of transmission couplings 28 for a given roller system 10, alternative embodiments may use different types of transmission couplings 28 for a single roller system 10.

The roller system 10 has a plurality of additional transmission couplings 28 coupled between other adjacent rollers 16. Accordingly, the rollers 16 directly receiving torque from the motor 30 transmit that same torque to their adjacent rollers 16, which proceed to transmit that same torque to other adjacent rollers 16. Thus, during use, the motor 30 transmits torque from its rotor 32, to at least one directly coupled roller 16, and then to other downstream rollers 16 coupled with upstream rollers 16 already receiving the torque.

Figure 3:
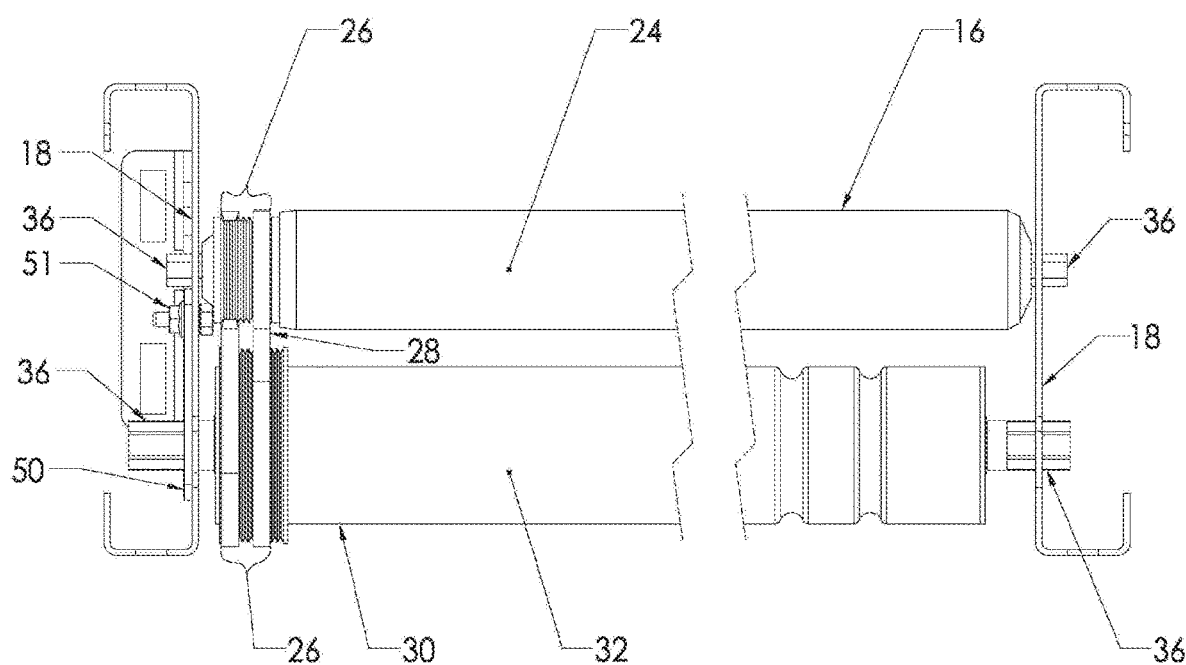
FIG. 3 schematically shows a cross-sectional view of the roller system of FIG. 1 across line X-X in accordance with one embodiment of the invention.

FIG. 3 schematically shows the relationship and interaction of the motor and one of its directly coupled rollers 16. This figure therefore shows a cross-sectional view of the roller system 10 across line X-X of FIG. 1. In this embodiment, the motor 30 has two ends that each respectively extend substantially to and through one frame member 18. The removably coupled connection (e.g., with or without a bolt or other removably fastenable device) enables easy removal of the motor 30. As such, the motor 30 is modular relative to the frame 14 (i.e., they form two modules) It should be noted that a removable connection does not require damaging or otherwise breaking the structure of the roller system 10 for motor removal. For example, if the motor 30 were welded at its ends to the frame 14, then the connection would require the motor 30 to be cut or otherwise forcibly removed from the frame 14—not a removably coupled connection. Moreover, mere repairability of a damaged frame 14 does not suggest a removable connection.

This embodiment also has a pair of O-ring type transmission couplings 28 at or near the left end of the motor 30 and roller 16 from the perspective of the figure. Although this example has two transmission couplings 28 between the motor 30 and one or more rollers 16, some embodiments may use fewer or more. For example, the roller system 10 may have one or more additional transmission couplings 28 in other locations. Other embodiments may position the transmission couplings 28 nearer different ends of the motor 30. Those skilled in the art can select the appropriate type, location, and number of transmission couplings 28 based on a variety of design and business factors.

In a manner similar to FIG. 2, FIG. 3 shows the spacing of the motor from the roller plane 22. That spacing can depend on a number of variables, such as the desired performance of the roller system 10, or the type of transmission couplings 28. Those skilled in the art can select that spacing based on those and any of a variety of other factors. Indeed, as noted above, the motor is spaced at least from the roller 16 to which it is coupled. Some embodiments with non-linear frames 14 may position the motor 30 in the same plane as another roller plane 22 defined by other rollers 16 not directly coupled with the motor 30.

As known in the art, the torque produced by an external rotor motor 30, such as that used by the embodiments in FIGS. 2 and 3, increases approximately with the square of its diameter. This can provide a substantial benefit in high-torque applications if a larger motor 30 can be used. Undesirably, prior art designs using motorized rollers 16 known to the inventor are generally limited to have a diametrical size that generally approximates that of the other rollers 16. Spacing the motor 30 from the roller plane 22 in the manner discussed above and below obviates that handicap by enabling use of a motor 30 having an appreciably larger diameter. Specifically, the diameter of the motor 30 is limited primarily by the size of the area permitted for the motor 30 beneath the roller plane 22.

The diameter of the motor 30 of FIG. 3, for example, is larger than that of the rollers 16 it energizes. In that example, the rollers 16 may be completely within the top and bottom region defined by the two frame members 18. Specifically, from the perspective of FIG. 3, the frame region 20 may be considered to be formed by the volume between top of the roller plane 22 and the plane identified as "bottom plane P", which is formed across the bottom of the frame 14. That volume also is bounded by the frame members 18 on the left and right sides. Alternatively, the motor 30 may be larger or re-positioned so that a portion of it may extend outside of the frame region 20. For example, such alternative embodiments may permit the motor 30 to at least partly extend out of the frame region 20 beyond the bottom plane P. In both types of embodiments, however, the motor 30 and rollers 16 are between the two frame members 18. Accordingly, the motor 30 can have a diameter that is the same as, smaller, or larger than those of the rollers 16.

In addition to enabling use of a wider variety of motors 30 (e.g., a larger motor 30 for more torque, or a smaller motor 30 for less torque), illustrative embodiments also permit the motor 30 to be replaced more easily due to its placement away from the roller plane 22 and its removable connection. This design further favorably eliminates damaging cantilevering forces inherent in prior art designs known to the inventor.

Specifically, motors having an internal rotor typically extend their rotors from the main body of the motor and position a transmission coupling from that protruding portion. This produces a cantilevering force to the motor that can eventually break down the motor more rapidly. Illustrative embodiments avoid that cantilevering problem by positioning the transmission coupling 28 along the main portion of the motor 30. The structure of the motor 30 enables such a beneficial result. A more detailed description of the design of illustrative embodiments of the motor 30 highlights this benefit.

Figure 4:
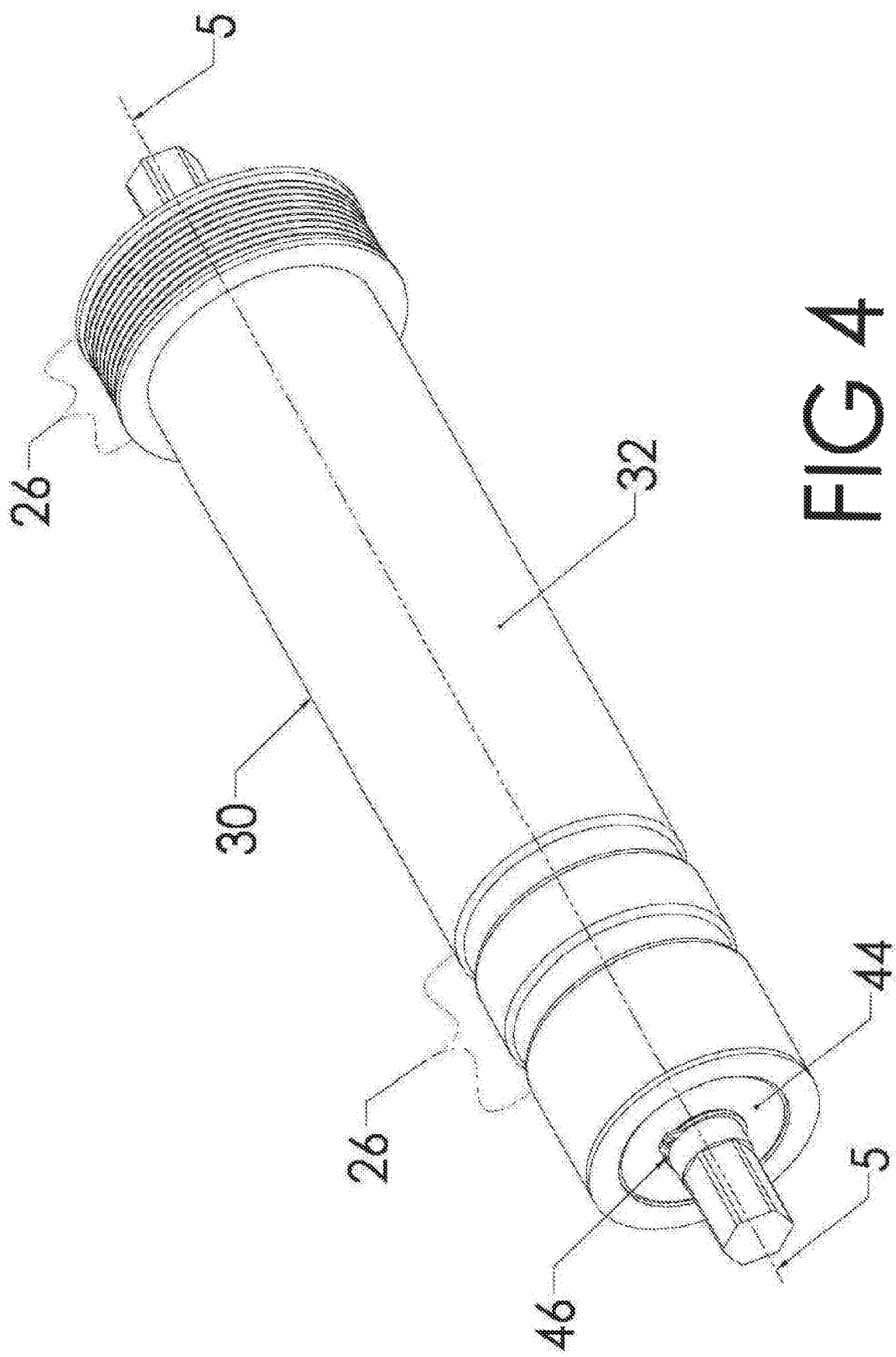
FIG. 4 schematically shows a perspective view of an illustrative external rotor motor that may be used with the roller system of FIG. 1 in accordance with illustrative embodiments of the invention.

To that end, FIG. 4 schematically shows one generic type of external rotor motor 30 that may be used to provide the non-cantilevered torque discussed above. As shown, the motor 30 has an outer, generally tubular rotor body having a circular/elliptically shaped cross section at many or all locations. The rotor body can be formed in a variety of manners, such as by machining a solid metal tube, from rolled metal, or by other means. As suggested above, this tubular rotor body effectively forms the rotor 32 of the motor 30. Also as shown, the belt region 26 of this design can use two different types of transmission couplings 28. Specifically, the belt region 26 has a first portion that accepts O-ring belts (as in FIG. 4), and a second, non-contiguous portion that can accept Poly-V belts. To better understand the motor 30, FIG. 5 schematically shows a cross-sectional view of the motor 30 across line 5-5, while FIG. 6 schematically shows an exploded view of the motor 30.

Figure 5:
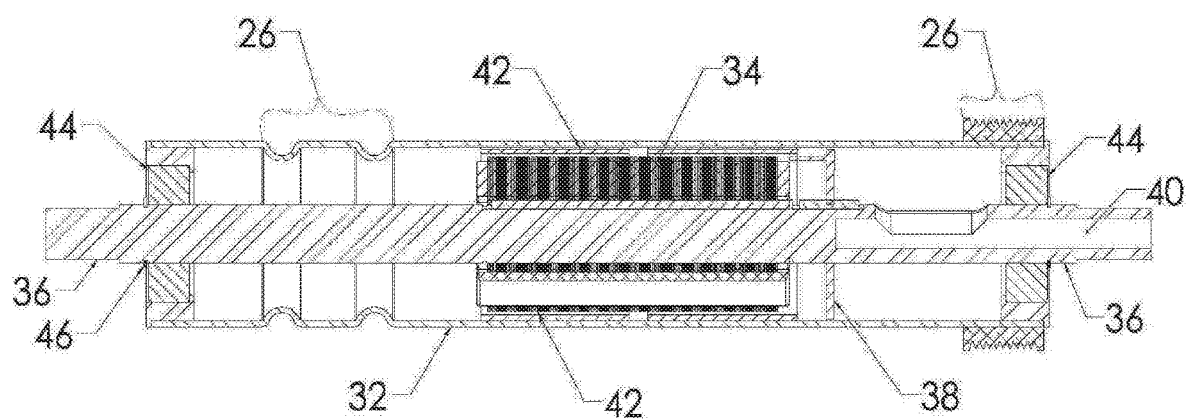
FIG. 5 schematically shows a cross-sectional view of the motor of FIG. 4 across line 5-5.
Figure 6:
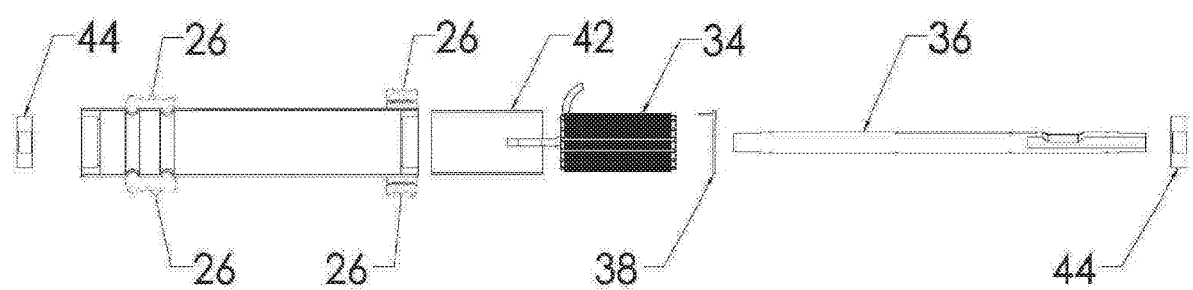
FIG. 6 is an exploded view of the motor of FIG. 4.

As shown in FIG. 5, the motor 30 also has a stationary portion that cooperates with the rotor 32 to cause the rotor 32 to rotate. The rotor 32 therefore is positioned radially outward relative to the stationary portion—it partly or completely circumscribes the stationary portion (i.e., it partly or completely circumscribes the stator 34).

As such, in illustrative embodiments, the motor 30 preferably is a brushless, DC motor. To that end, the stationary portion has the above noted stator 34 (formed by a plurality of windings) that extends around a linear portion of stationary shaft 36. A printed circuit board 38 to the right of the windings controls commutation of the motor 30. For example, the printed circuit board 38 may have magnetic sensors (e.g., Hall sensors) to detect movement of the rotor 32. Other embodiments may have other circuitry or mechanisms to detect rotor movement, and/or may position the commutation circuitry/printed circuit board 38 outside of the motor housing/rotor 32. Part or all of the shaft 36 may form a hollow bore 40 to permit wiring to couple with the printed circuit board 38 and the stator 34. That wiring may include control wires 35 (FIG. 12, discussed below) to transmit magnetic signals, energizing wires 35 to energize the electromagnet formed by the stator 34, and wires 35 for other functions. Alternative embodiments may position some of the commutation circuit outside of the motor 30 (i.e., an external controller).

To interact with the stator 34 for commutation, the rotor 32 has a permanent magnet 42 secured to much of its internal surface. In illustrative embodiments, the magnet 42 includes a ring magnet or similar magnet. For example, the magnet 42 may include a hot pressed, sintered magnet of high purity. Such a magnet 42 is formed primarily of magnetic material and coupling media. A minimal amount of fillers preferably is used.

The commutation circuitry 38 therefore detects rotation of the magnet 42 of the rotor 32 to energize the overall motor 30. To rotatably couple the rotor 32 about the stationary portion, the motor 30 also has a first bearing 44 (to the left side of the motor 30 from the perspective of FIG. 5) and a second bearing 44 (to the right side of the motor 30 from the perspective of FIG. 5). A clip 46 at each end may secure the bearings 44 to the shaft 36.

The transmission coupling 28 therefore couples to the motor 30 between the two bearings 44. Accordingly, from the perspective of the two bearings 44, the transmission coupling 28 does not produce a cantilevered force—it applies its force between the two bearings 44, which each delivers a Newtonian counteracting force on both sides of the transmission coupling 28. This is in contrast to roller system designs in which the transmission coupling 28 provides a force that is cantilevering relative to both bearings 44. In other words, with non-cantilevered designs, the transmission coupling 28 provides a force that is counteracted by a force on one side only (i.e., one side of the shaft 36). Although that one sided force may be provided by two or more bearings 44, it still is cantilevered. Illustrative embodiments, however, provide a counteracting supporting force on both sides of the transmission coupling 28. As such, the shaft 36 and motor 30 components should experience less stress, enhancing the lifespan of the motor 30 and, ultimately, the roller system 10.

At the end of the lifespan of the motor 30, however, one skilled in the art may easily replace the motor 30 due to its strategic placement away from the roller plane 22. Moreover, the motor 30 preferably is a "gearless" motor. As its name suggests, such a motor 30 has no gears. Such a design is simpler than a geared motor and should be less prone to breakdown.

Alternative embodiments may use other type of motors 30, such as a brushed motor, or a geared motor. Accordingly, discussion of the specific type of motor 30 of FIGS. 4-6 is illustrative and not intended to limit all embodiments of the invention.

Figure 7:
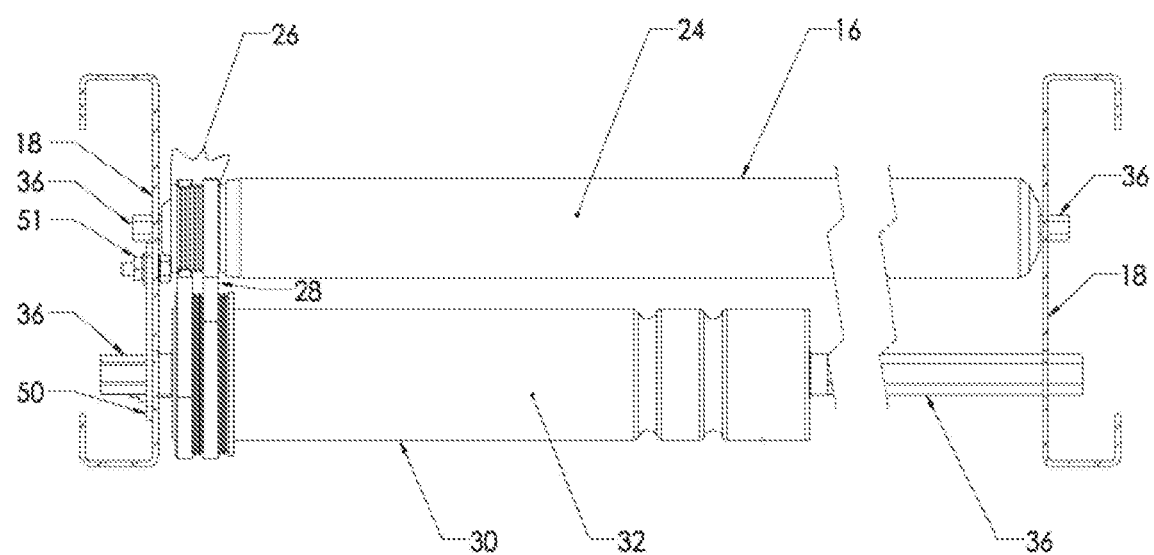
FIG. 7 schematically shows a cross-sectional view of the roller system of FIG. 1 across line X-X in accordance with a second embodiment of the invention.

Some embodiments may have longer shafts 36 and shorter rotors 32. FIG. 7 shows one such embodiment. This embodiment may be an efficient way to use a motor 30 with a linearly smaller rotor 32 and stator 34 across a frame 14 having farther spaced apart spaced frame members 18.

Figure 8A:
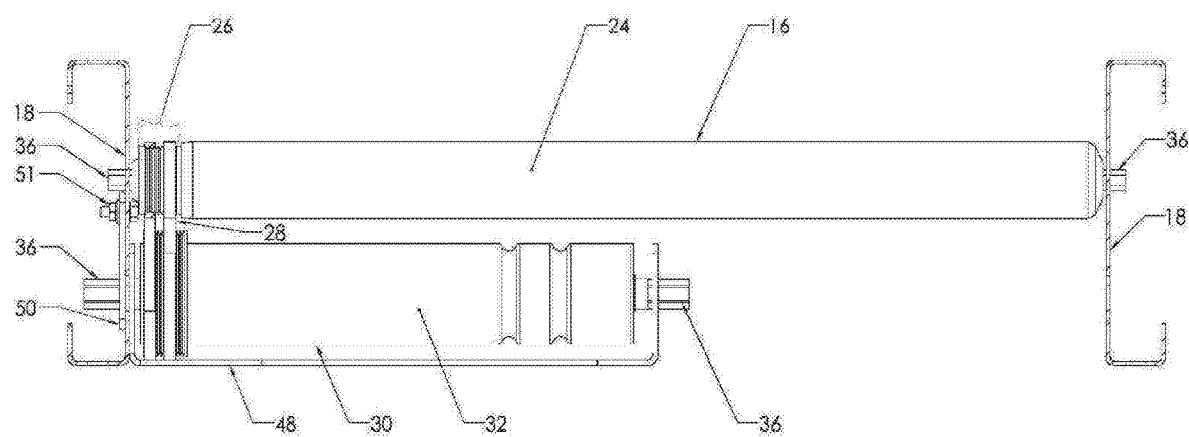
FIG. 8A schematically shows a cross-sectional view of the roller system of FIG. 1 across line X-X in accordance with a third embodiment of the invention.

Alternative embodiments do not necessarily extend the motor 30 the entire distance between the two frame members 18. Among other ways, a support member 48 may support one or both ends of the motor 30. To that end, FIG. 8A schematically shows one such alternative embodiment in which one end of the motor 30 is coupled with one frame member 18, while the other end is supported by the support member 48. The support member 48 in this embodiment couples with both frame members 18 by some permanent or removable connection. Alternatively, the support member 48 may couple with only one of the frame members 18, hang from the roller plane 22 (e.g., connected to a support member 48 coupled with the frame 14), or from a plane beneath the motor 30.

FIG. 8B schematically shows a perspective view of one embodiment of the support member 48. In this embodiment, the support member 48 is configured to be capable of supporting one motor 30. In alternative embodiments, the support member 48 is configured to support two closely spaced motors 30. Among other things, the support member 48 may be formed as a metal or other robust bracket that is bolted to the frame 14. Using holes and/or openings/apertures, the motor 30 may be coupled with the bracket in a similar manner to the way it is coupled with the frame 14 in other embodiments.

Specifically, as in some other embodiments, the portion of the shaft 36 at the end spaced from the frame 14 may be threaded and thus secured to the support member 48 using a bolt. Also in a manner similar to other embodiments, that end of the shaft 36 preferably also has structure for preventing shaft rotation. Among other ways, the portions of the shaft 36 at that end may have a special cross-sectional shape, such as a hexagonal or rectangular shape, that extends through a corresponding female shape in the support member 48. For example, a portion of the shaft 36 having a hexagonal cross-sectional shape may extend through a hexagonal opening through the support member 48. The inner dimension of the hexagonal opening should be slightly larger than the outer dimension of the shaft 36 at that point and yet, provide a reasonably tight fit. Alternative embodiments omit the fastening device, such as the noted nut. In that case, the motor 30 is simply secured by its coupling with the opening in the support member 48.

Figure 9:
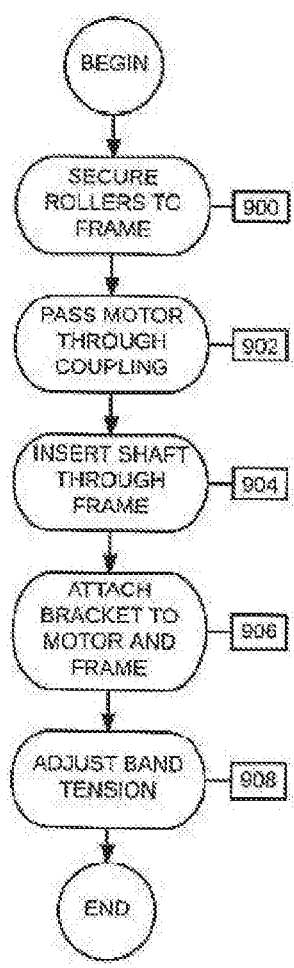
FIG. 9 shows a method of assembling the roller system of FIG. 1 in accordance with illustrative embodiments of the invention.

Illustrative embodiments can assemble the roller system 10 in any of a variety of manners. FIG. 9 shows one example of a process of assembling the roller system 10 of FIG. 8A in accordance with illustrative embodiments of the invention. It should be noted that this process is substantially simplified from a longer process that may be used to assemble the roller system 10. Accordingly, the process of assembling the roller system 10 may have additional steps, such as testing steps, electrical connection steps, and/or lubrication steps, which those skilled in the art may use. In addition, some of the steps may be performed in a different order than that shown, or at the same time. Those skilled in the art therefore can modify the process as appropriate. Moreover, as noted above, many of the materials and structures noted are but one of a wide variety of different materials and structures that may be used. Those skilled in the art can select the appropriate materials and structures depending upon the application and other constraints. Accordingly, discussion of specific materials and structures is not intended to limit all embodiments. Finally, it should be noted that this process may be extrapolated to form other discussed embodiments of the roller system 10, such as the embodiment of FIG. 4.

The process of FIG. 9 begins at step 900, which secures the rollers 16 to the frame 14. For embodiments using a nut, this step may fasten the rollers 16 with the requisite nuts. Each of the rollers 16 to couple with a motor 30 (referred to herein as "motor-coupled rollers 16") has a transmission coupling 28 that, at this point, is simply hanging around its periphery. The rollers 16 also are coupled to other rollers 16, such as adjacent rollers 16, via secondary transmission couplings 28, in the manner as shown in FIG. 2. These secondary transmission couplings 28 translate torque from the motor-coupled rollers 16 to the rollers 16 not coupled with the motor(s) 30.

Next, each motor 30 is passed through the transmission coupling(s) 28 hanging down from the motor-coupled rollers 16 (step 904). Some embodiments may couple each motor 30 with just one motor-coupled roller 16, while other embodiments may couple each motor 30 with two, three, or more motor coupled rollers 16. For example, FIG. 2 shows one motor 30 coupled with two motor-coupled rollers 16.

Step 906 then attaches the support member 48 to both the motor 30 and the frame 14. To that end, automated processes or an assembler may pass the shaft 36 through the frame 14 on the left end (from the perspective of FIG. 8A) and through the opening in the support member 48 on the right end. Some removable securing mechanism then may be added to provide a strong connection.

In some embodiments, the shaft 36 couples with a longitudinal slot through the frame 14 extending downwardly. In a similar manner, the support member 48 also may couple with the frame 14, on one or both frame members 18, through a similar slot member also extending downwardly. This slot may mate with a flat on the shaft 36 to inhibit/prevent shaft rotation. At this stage, step 908 adjusts the tension in the transmission coupling 28 to ensure an appropriately tight fit between the external rotor 32 and the motor-coupled roller(s) 16. For example, FIGS. 3, 7 and 8A show an adjusting plate 50 and adjusting bolt 51 that enable that tension adjustment. After the tension is appropriately set, the bracket and motor 30 may be more securely fastened in place to the frame 14.

Accordingly, as noted above, illustrative embodiments produce an efficient, more flexible roller system 10 that can provide more precise torques, whether a high or low torque. In addition, the non-cantilevered, gearless motor is expected to be more robust, thus lengthening the lifespan of the roller system 10. Spacing of the motor 30 from the roller plane 22 necessarily spaces a significant source of heat (i.e., the motor 30) from objects 12 translated by the roller system 10. Accordingly, the roller system 10 should have less impact on heat sensitive objects 12 (e.g., dairy, frozen foods, and/or produce).

Figure 10:
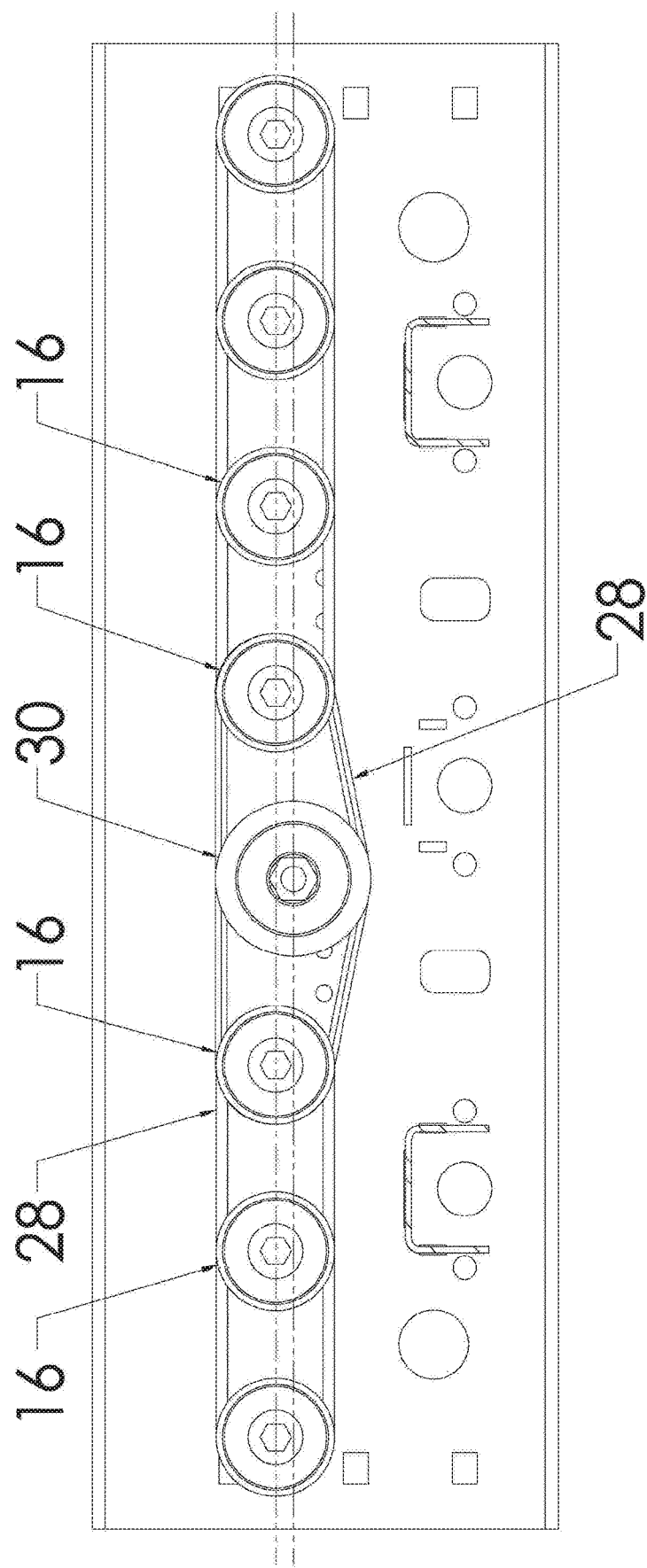
FIGS. 10 and 11 schematically show another embodiment of the invention.
Figure 11:
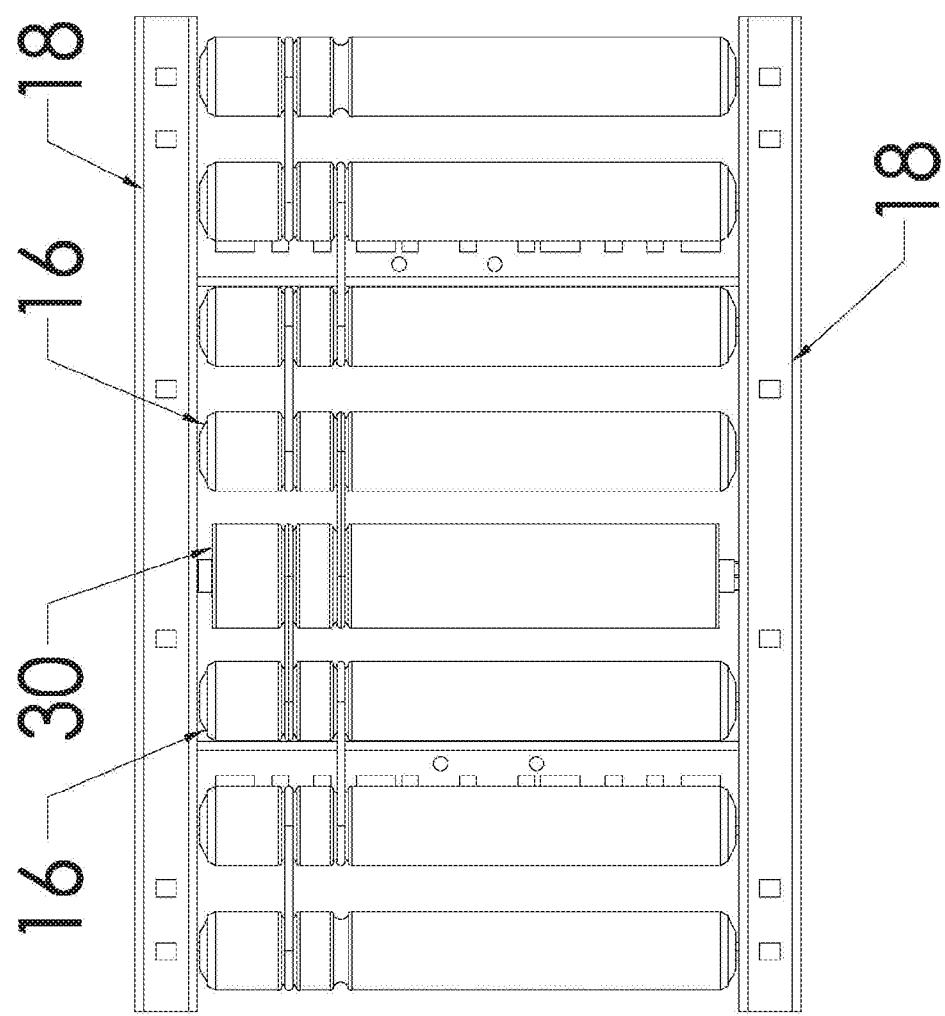

FIGS. 10 and 11 respectively show another embodiment of the invention in which the motor 30 is not fully spaced from the roller plane 22. In this embodiment, the motor 30 is not spaced from the roller plane 22 (it takes up the entire cross-sectional/thickness of the roller plane 22) and, in fact, is aligned with the top of the roller plane. This embodiment nevertheless forms a roller shaft plane 22A from the roller shafts. In a manner similar to other embodiments, the motor shaft 36 is spaced from the roller shaft plane 22A despite the position and size of the motor 30 itself. A related embodiment is shown in other figures, such as FIGS. 3, 7, and 8A.

Figure 12:
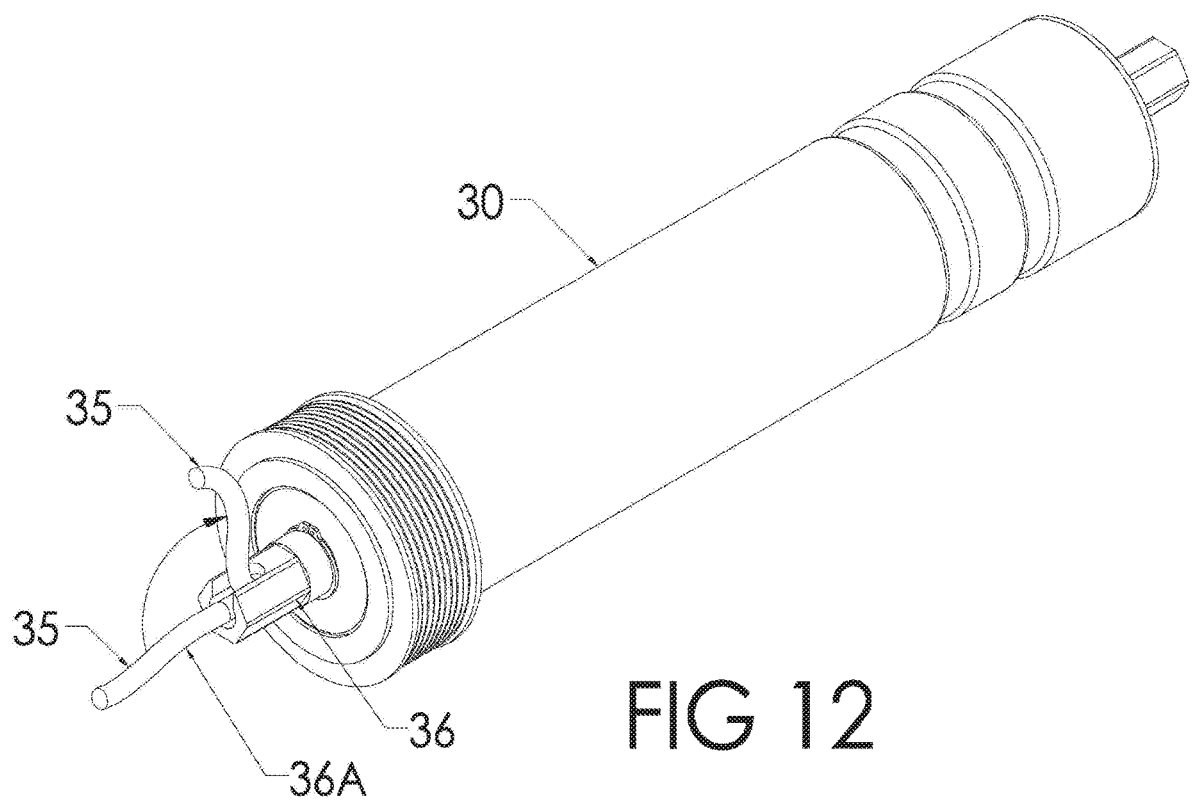
FIGS. 12 and 13 schematically show the motor in accordance with other embodiments.
Figure 13:
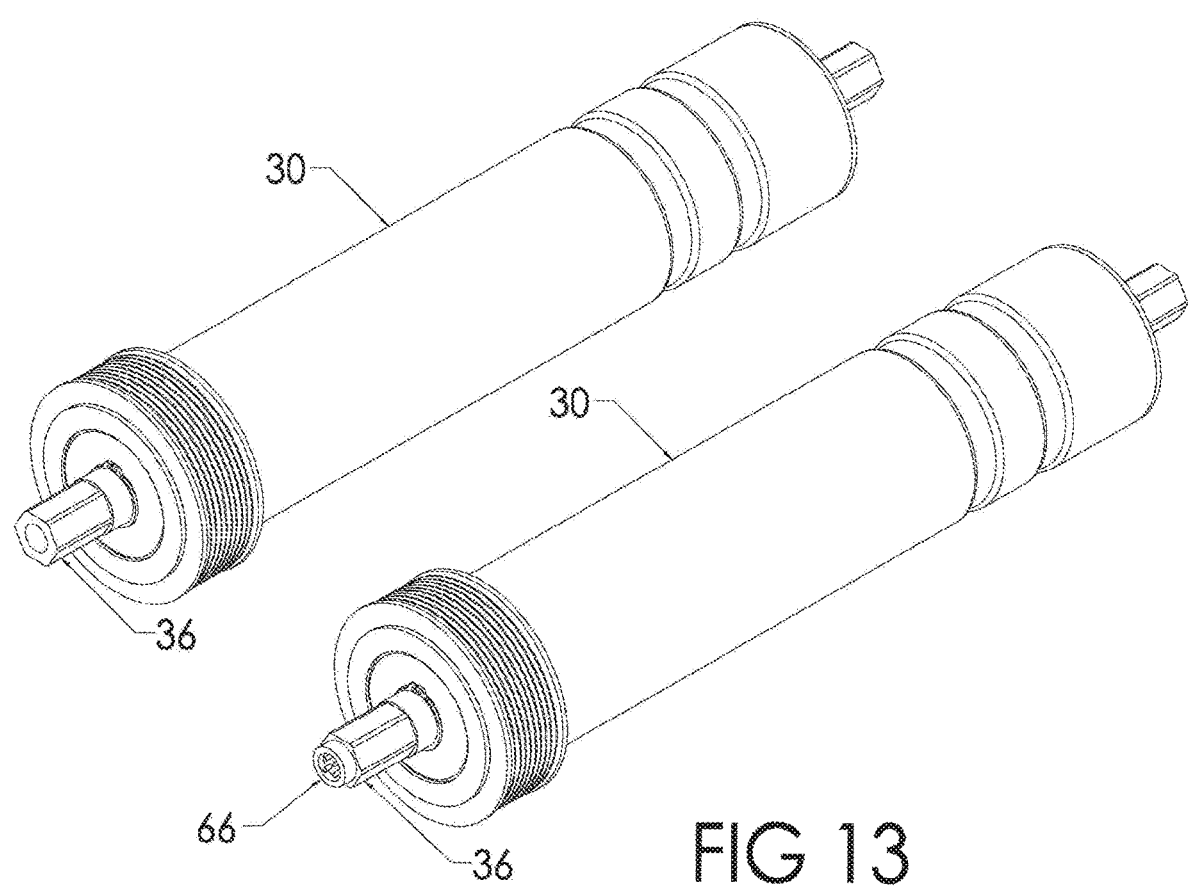

During use, the wires 35 noted above may become damaged. To minimize that impact, FIG. 12 schematically shows the shaft as having a wire slot 36A that enables the wires 35 to bend into the slot, minimizing the risk of damage. Alternatively, rather than have the wires 35, some embodiments (FIG. 13) may have a connector interface 66 (e.g., with a pin pattern as shown) that couples with an external cable (not shown).

Although the above discussion discloses various exemplary embodiments of the invention, it should be apparent that those skilled in the art can make various modifications that will achieve some of the advantages of the invention without departing from the true scope of the invention.

What is claimed is:

1. A roller system comprising:
    a frame;
    a plurality of rollers supported by the frame, each of the plurality of rollers having a roller shaft, the plurality of roller shafts forming a roller shaft plane;
    an external rotor motor ("motor") having a stator and an external rotor, the external rotor being radially outward of the stator to substantially circumscribe the stator, the motor also having a motor shaft spaced from the roller shaft plane, the motor shaft being configured to not rotate when the motor is energized, the motor being coupled with the frame in a non-cantilevered manner; and
    a transmission coupling coupled with the external rotor and at least one of the rollers,
    the transmission coupling and external rotor configured so that rotation of the external rotor causes the at least one roller to rotate in response to a torque received through the transmission coupling.

2. The roller system as defined by claim 1 wherein the frame has a first frame portion spaced from a second frame portion, the plurality of rollers and motor being between the first and second frame portions.

3. The roller system as defined by claim 1 further comprising a support member, further wherein the motor has a first end coupled with the frame and a second end coupled with the support member, the second end being spaced from the frame.

4. The roller system as defined by claim 1 further comprising a support member, further wherein the motor has a first end and a second end, the support member supporting at least one of the first and second ends, the second end being spaced from the frame.

5. The roller system as defined by claim 1 wherein the motor comprises a gearless motor.

6. The roller system as defined by claim 1 wherein the transmission coupling includes a transmission belt circumscribing at least a portion of the external rotor and at least a portion of the at least one roller.

7. The roller system as defined by claim 1 wherein the transmission coupling comprises one of a band, a flex coupling, a chain, and a timing belt.

8. The roller system as defined by claim 1 wherein the frame has a first frame portion spaced from a second frame portion, the motor having a first end coupled with the first frame portion, the motor having a second end coupled with the second frame portion.

9. The roller system as defined by claim 1 wherein the external rotor includes a first end and a second end, the rotor being positioned relative to the stator via a first bearing and a second bearing, the first bearing being closer to the first end than to the second end, the second bearing being closer to the second end than to the first end, the transmission coupling being coupled with the external rotor between the first and second bearings.

10. The roller system as defined by claim 1 wherein the motor comprises a brushless DC motor with a magnet, the magnet being one of a hot pressed ring magnet or a sintered ring magnet.

11. The roller system as defined by claim 1 further including a removable coupling configured to removably secure the motor to the frame.

12. The roller system as defined by claim 1 wherein the external rotor has a rotor outer diameter and the at least one roller has a roller outer dimension, the rotor outer dimension being greater than the roller outer dimension.

13. The roller system as defined by claim 1 wherein the plurality of rollers includes an additional roller, the additional roller being coupled with the at least one roller by a secondary transmission coupling, the secondary transmission coupling and the at least one roller configured so that rotation of the at least one roller causes the additional roller to rotate in response to an additional torque received through the secondary transmission coupling.

14. The roller system as defined by claim 1 further comprising a commutation circuit at least partially external to the motor.

15. The roller system as defined by claim 1 wherein the motor is modular relative to the frame.

16. The roller system as defined by claim 1 wherein the external rotor of the motor comprises stainless steel.

17. The roller system as defined by claim 1 wherein the motor comprises a wire extending through the motor shaft, the motor shaft having a slot for accommodating the wire.

18. The roller system as defined by claim 1 wherein the shaft includes a connector interface for coupling with an external cable, the connector being electrically coupled with commutation circuitry of the motor.

19. A roller system comprising:
    a frame having a first frame portion spaced from a second frame portion;
    a plurality of rollers rotatably coupled between the first frame portion and the second frame portion, the plurality of rollers forming a roller plane;
    a gearless DC motor ("motor") spaced from the roller plane and positioned between the first frame portion and the second frame portion, the motor having a stator and an external rotor, the external rotor being radially outward of the stator, the motor being coupled with the frame in a non-cantilevered manner; and
    a transmission coupling coupled with the external rotor and at least one of the plurality of rollers, rotation of the external rotor causing rotation of the at least one roller.

20. A roller system comprising:
    a frame;
    a plurality of rollers supported by the frame, the plurality of rollers forming a roller plane; and
    means for controlling rotation of the plurality of rollers, the controlling means being spaced from the roller plane and being coupled with the frame in a non-cantilevered manner,
    the controlling means comprising external rotor means and means for transmitting mechanical energy from the external rotor means to at least one of the plurality of rollers,
    the transmitting means and external rotor means configured so that rotation of the external rotor means causes the at least one roller to rotate in response to a force received through the transmitting means.

* * * * *